United States Patent [19]
Gay et al.

[11] 3,751,890
[45] Aug. 14, 1973

[54] GROUND ENGAGING HAY BALE ROLLING APPARATUS

[75] Inventors: James E. Gay; John W. Bliss, both of Vinton, Iowa

[73] Assignee: Starline, Inc., Harvard, Ill.

[22] Filed: June 17, 1971

[21] Appl. No.: 152,623

[52] U.S. Cl. ............................ 56/16.4, 56/1, 56/341
[51] Int. Cl. .............................................. A01d 75/00
[58] Field of Search ................. 56/1, 341, 342, 343, 56/16.4

[56] References Cited
UNITED STATES PATENTS
3,680,296  8/1972  Beebout .......................... 56/16.4
3,110,145  11/1963  Avery ............................... 56/1

*Primary Examiner*—Russell R. Kinsey
*Attorney*—Hofgren, Wegner, Allen, Stellman & McCord

[57] ABSTRACT

A hay bale rolling apparatus adapted to be drawn along a swath or a windrow of hay behind a tractor to roll the windrow into a series of separate bales in contact with the ground. The apparatus is entirely hydraulically operated from a tractor hydraulic system and has a single two-position mechanical control valve to control a cycle of baling, bale release and return to baling. The valve may be actuated to release a bale manually by an operator on a tractor or automatically by a sensing means which directly senses the diameter of a bale; and is automatically returned from release position to baling position after a bale is released.

21 Claims, 5 Drawing Figures

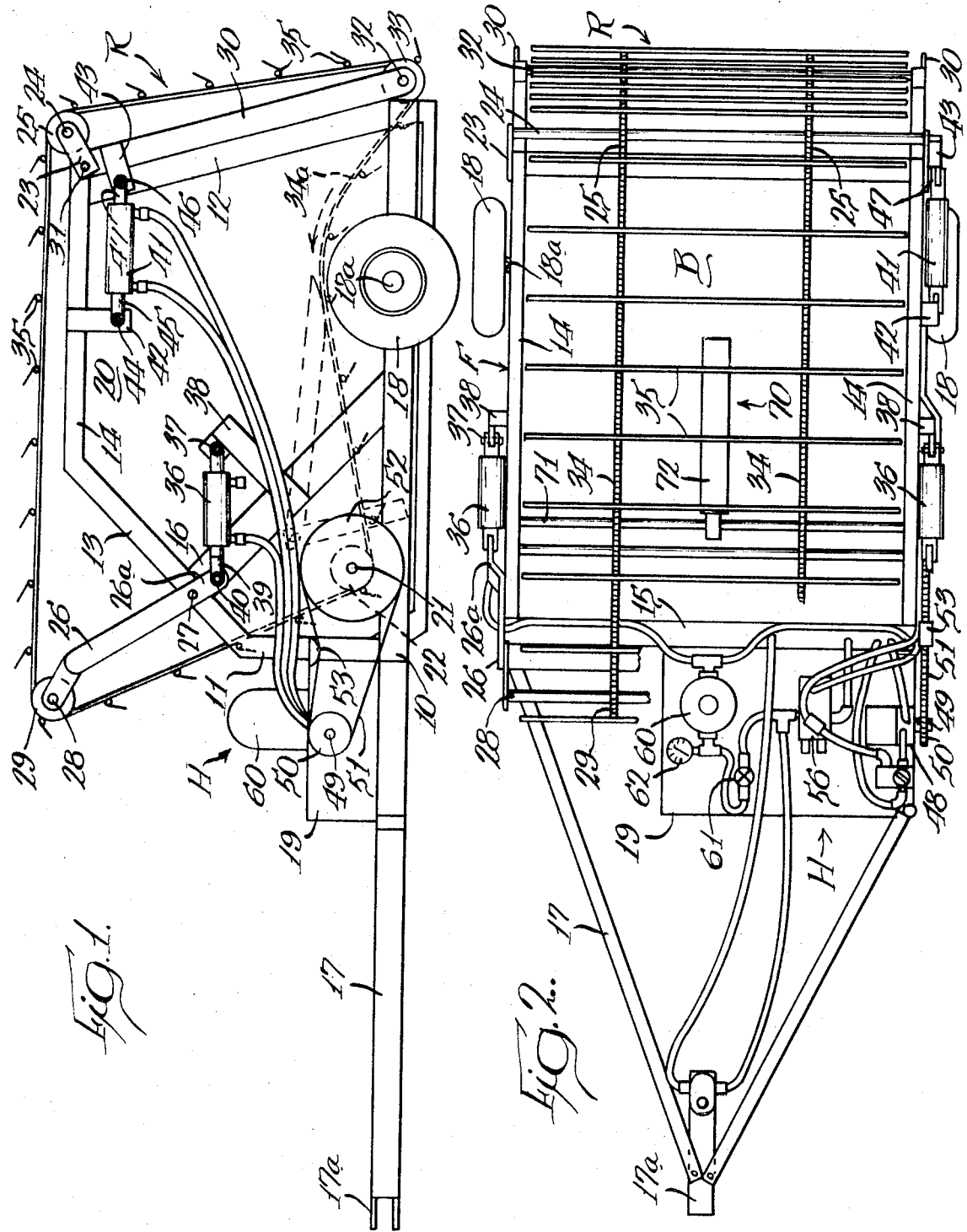

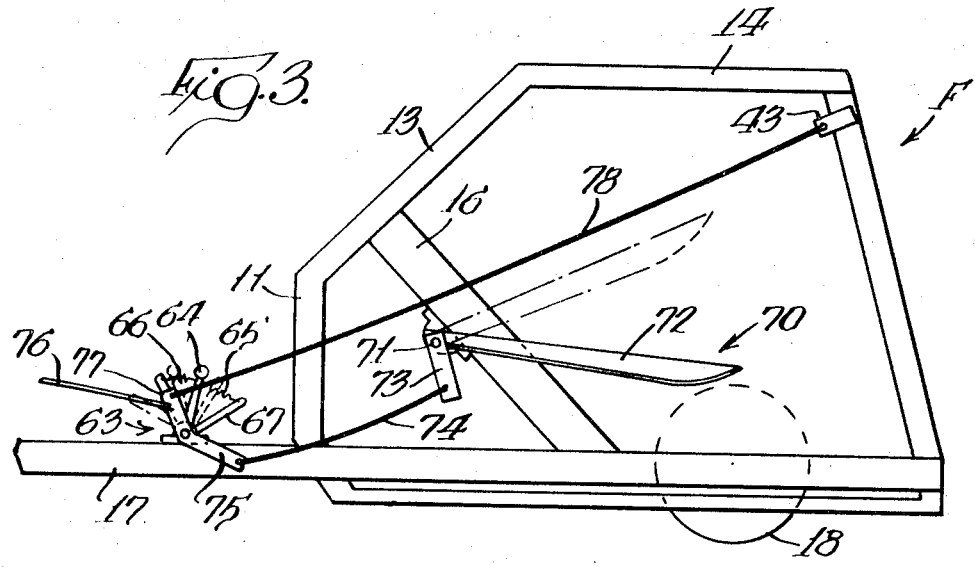
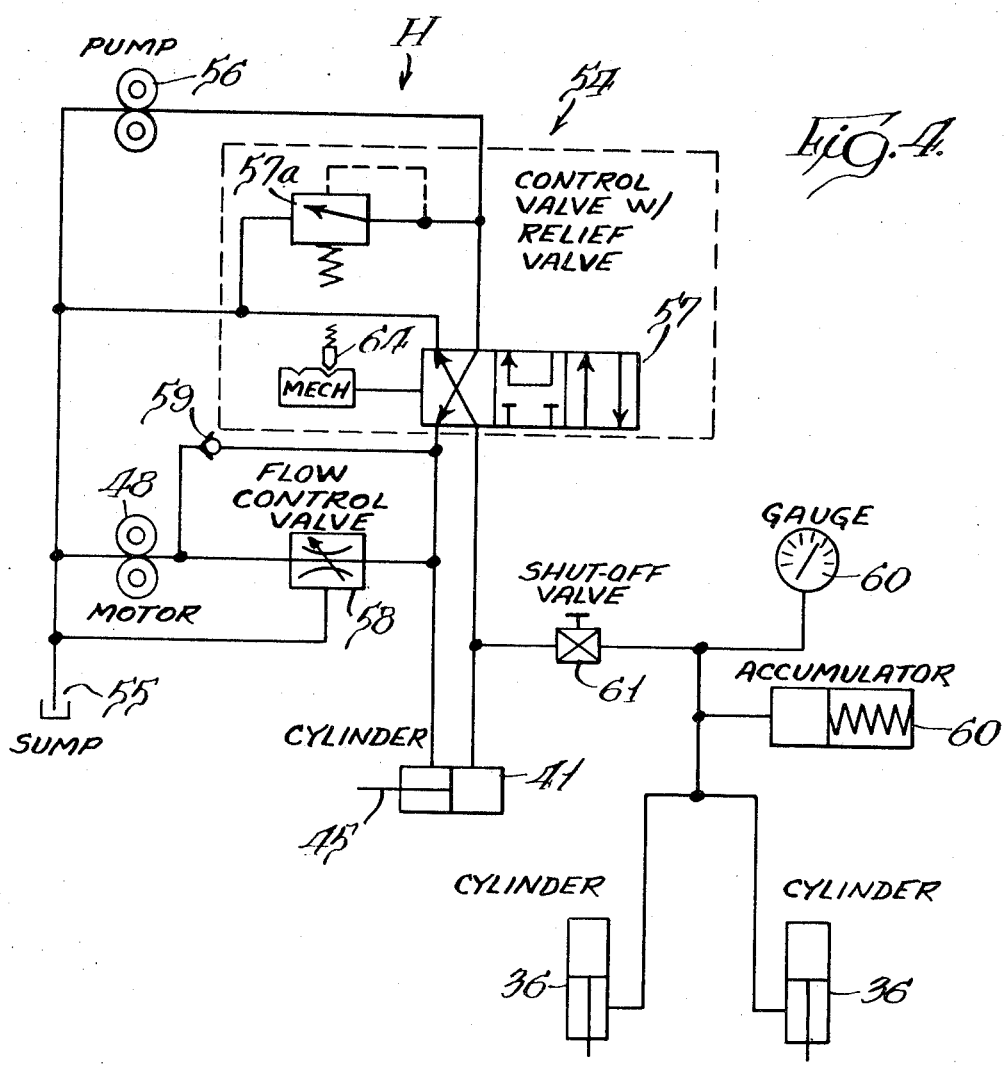

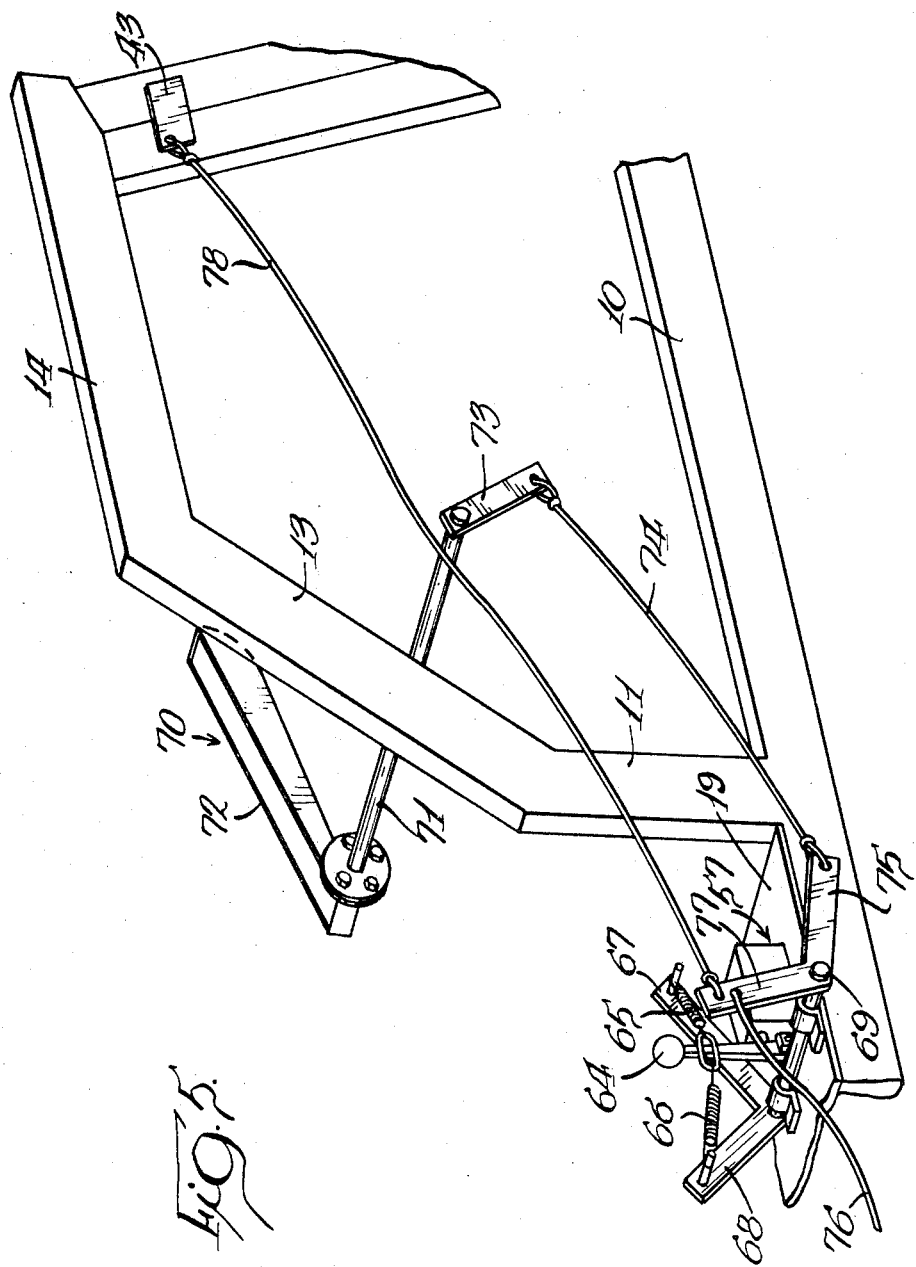

GROUND ENGAGING HAY BALE ROLLING APPARATUS

BACKGROUND OF THE INVENTION

The only known prior art apparatus for rolling a swath or a windrow of hay into bales in contact with the ground is disclosed in Avery U.S. Pat. No. 3,110,145 and its counterpart Australian and British patents. The Avery unit has driven baling chain means which is trained over one pair of fixed sprockets at the front, one pair of upper sprockets which are mounted on pivoted upper arms, and one pair of rear sprockets that are mounted on pivoted rear arms. The upper arms are spring urged to an elevated position and swing downwardly to permit the lower run of the baling chain to arch upwardly as the size of a bale increases. The rear arms are latched in a depending position while a bale is rolled, and when the upper arms have moved down a predetermined distance they unlatch the rear arms which swing upwardly and rearwardly to release a bale. Thereupon the rear arms drop by gravity to their original latched position and the spring means return the upper arms to their elevated position to start rolling another bale. During discharge the drive connection to the baling chain means is disengaged.

The principle of the Avery baler is sound; but the drive and control arrangements have some disadvantages.

SUMMARY OF THE INVENTION

The principal object of the present invention is to provide improved apparatus for rolling a swath or a window of hay into a series of separate bales in contact with the ground. As used herein, of course, the word "hay" is intended to include all fodder crops which are swathed or windrowed and are capable of being rolled into a bale.

In accordance with the present invention, a hay bale rolling apparatus of the described type is entirely hydraulically powered and controlled. A hydraulic motor drives the baling chains, hydraulic cylinder and piston means coupled with an accumulator controls movement of the upper arms from a starting position to a terminal position and their return to the starting position, and hydraulic power means serves both to normally retain the rear arms in their depending position and also to elevate those arms in order to release a finished bale from the baling apparatus.

A single, two-position, mechanical hydraulic control valve controls a cycle of baling, bale release, and return to baling. In a running position of the valve the hydraulic motor operates to drive the baling chains, the hydraulic power means is conditioned to retain the rear arms in their depending position, and the hydraulic cylinder and piston means is conditioned to extend gradually as the force created on the lower run of the chains by the increasing size of the bale exerts pressure to force the upper arms downwardly. When a bale is to be released from the apparatus the mechanical control valve is moved to a release position where the hydraulic motor is stopped, the hydraulic power means is operated to elevate the rear arms and release a bale from the chamber, and the hydraulic cylinder and piston means, acting in concert with the accumulator, returns the upper arms to their original positions as the pressure on the lower run of chains is released.

A mechanical linkage between the rear arms and the mechanical control valve acts when the arms have reached a predetermined elevated position to return the valve to its running position which thus returns the rear arms to their lowered position and again starts operation of the hydraulic motor. A check valve in the hydraulic motor circuit permits the motor to idle in reverse as the bale is released so that engagement between the chains and the finished bale does not interfere with such release.

Actuation of the mechanical control valve to move it from running position to release portion may be produced manually by an operator who is driving the tractor that tows the apparatus; or it may be automatically produced by mechanical sensing means in the baling chamber including a pivoted arm which has a free end resting on top of a forming bale. When the arm reaches a predetermined position in accordance with the desired size of bale to be produced, a mechanical connection between the arm and the mechanical control valve moves the valve from running position to release position.

As used herein the term "swath" designates either a swath or a windrow.

DESCRIPTION OF THE DRAWINGS

FIG. 1 is a somewhat schematic side elevational view of the apparatus of the invention with the parts in the position that they occupy during the early stages of the rolling of a bale;

FIG. 2 is a plan view of the apparatus of FIG. 1 with parts omitted for clarity of illustration;

FIG. 3 is a generally schematic side elevational view which particularly illustrates the mechanical actuating arrangements for the mechanical control valve;

FIG. 4 is a hydraulic diagram of the hydraulic system; and

FIG. 5 is a generally schematic perspective view to better illustrate the actuating means for the mechanical control valve.

DETAILED DESCRIPTION OF THE INVENTION

Referring to the drawings in greater detail, and referring first to FIGS. 1 and 2, the apparatus of the present invention includes a frame, indicated generally at F, on which is mounted bale rolling means, indicated generally at R. Drive and control of the bale rolling means R is produced by a mechanically actuated hydraulic system H which may be driven off the tractor's hydraulic system or which may be powered by the tractor power take-off.

The frame F includes lower longitudinal side beams 10, upright forward structural members 11, forwardly inclined rear structural members 12, a super structure including the rearwardly inclined upper structural members 13 and the horizontal top structural members 14, and a front cross beam 15. Also part of the frame are diagonal side beams 16, a draft tongue 17 having a bifurcated forward end 17a for pivotal connection to a tractor drawbar, and wheels 18 which are journalled on stub axles 18a at the sides of the lower beams 10. An enclosed platform 19 at the front of the frame provides support for the control components, hydraulic motor and hydraulic accumulator of the hydraulic operating and control system which will be described in more detail hereafter. Side plates 20 mounted upon and between the side beams 10 and the super structure members 13 and 14 define the sides of a baling chamber B which is open at the bottom.

The bale rolling means R includes a drive shaft 21 which is journalled in the front lower portion of the frame F in the side plates 20, and a pair of baling chain sprockets 22 are fixedly mounted upon the shaft 21 spaced a substantial distance inwardly from the side plates 20 as indicated by the lines of the baler chains in FIG. 2. At the upper rear corners of the frame are fixed brackets 23 which support a fixed cross shaft 24 on which is journalled a pair of idler sprockets 25 that are in the same vertical planes with the sprockets 22.

A pair of upper, forward sprocket arms 26 are pivotally mounted at 27 near their lower ends on the front diagonal super structure members 13 and support a fixed cross shaft 28 upon which is journalled a pair of front upper sprockets 29 which are also in the same vertical planes with the sprockets 22 and 25. The position of the forward sprocket arms 26 is controlled by parts of the hydraulic system H which will be described hereinafter.

A pair of rear sprocket arms 30 are pivoted at 31 in the upper rear corners of the frame, and at their free ends a fixed cross shaft 32 provides support for a pair of rear, lower chain sprockets 33 that are also in the same vertical planes with the sprockets 22, 25 and 29; and trained around all of said sprockets is a pair of baling chains 34 which are provided with cross raddles 35. The chains 34 have a lower chain run 34a between the front lower sprockets 22 and the lower rear sprockets 33, and said lower runs engage hay lying upon the ground in a swath so as to roll the hay into a bale as the apparatus is drawn along by a tractor. As the bale increases in size the lower chain runs 34a arches higher and higher within the baling chamber, and this is permitted by clockwise pivotal movement about the pivots 27 of the front sprocket support arms 26.

The hydraulic system H includes a pair of hydraulic cylinders 36 each of which is pivoted at 37 on a bracket 38, and each of which includes a piston rod 39 that is pivotally connected at 40 to a lower extension 26a of one of the front sprocket support arms 26. Accordingly, swinging movement of the arms 26 about their pivots 27 may be controlled by the hydraulic cylinder and piston units 36.

Hydraulic power means 41 in the form of a single rear cylinder and piston unit is supported between a bracket 42 on the top structural member 14 and a forwardly extending bracket 43 on one of the pivoted arms 30, there being a pivotal connection 44 between the bracket 42 and a piston rod 45, and a pivotal connection 46 between the bracket 43 and a bifurcated support arm 47 on the end of the cylinder. Accordingly, the hydraulic control system H may act through the hydraulic power means 41 either to retain the arms 30 in the position illustrated in FIG. 1 or to pivot those arms upwardly and rearwardly about their pivots 31 by extending the piston rod 45.

The baling chains are driven by a hydraulic motor 48 having an output shaft 49 on which a sprocket 50 is keyed, and a drive chain 51 is trained over the sprocket 50 and over a sprocket 52 on the chain sprocket shaft 21. A roller type chain tensioner 53 is adjustably mounted in the usual way.

Turning now to the hydraulic circuit of FIG. 4, the cylinder and piston units 36, the power unit 41, and the hydraulic motor 48 are all controlled by a hydraulic control circuit, indicated generally at 54, which includes a sump 55, a pump 56 which supplies fluid under pressure to the entire system, a mechanical control valve 57 which includes a relief valve 57a, a flow control valve 58 which controls the flow of fluid to the motor 48, a check valve 59 in the circuit for the motor 48, an accumulator 60 which functions in cooperation with the cylinder and piston units 36, a shut-off valve 61 and a pressure gauge 62.

A mechanical valve control, indicated generally at 63, includes a pivoted control handle 64 which is balanced between a rear tension spring 64 and a front tension spring 66 which are connected, respectively, to arms 67 and 68, both of which are fixedly mounted on a rotatable transverse shaft 69.

In the position illustrated in FIGS. 3, 4 and 5, the control handle 64 is toward the rear and the single mechanical control valve 57 is in a running setting with hydraulic fluid supplied under pressure to the power unit 41 to hold the rear sprocket arms in their downwardly extending positions, and fluid is also supplied through the flow control valve 58 to the motor 48 which drives the bale rolling means R. Accordingly, as the bale rolling apparatus is drawn forwardly along a swath of hay by a tractor the bottom run 34a of the baling chains 34 engages the hay in the windrow between the front lower sprocket 22 and the rear lower sprocket 33 to roll it into a bale as the machine moves forwardly. The system including the cylinder and piston units 36 and the accumulator 60 must be pregauged to a predetermined gauge pressure with the arms 30 elevated, the shut off valve 61 is then closed and these components operate independently. The gauge pressure may be adjusted to vary the amount of pressure required to swing the arms 26 rearwardly and thus permit the lower chain run 34a to arch upwardly. This, then, determines how tightly the bale is rolled.

When a bale has reached a desired size for discharge, as determined either by the operator on the tractor or by sensing means in the baling chamber, indicated generally at 70, the control handle 64 may be moved forwardly against the tension of the spring 65 to shift the mechanical control valve 57 to a discharge position in which fluid under pressure is supplied to the power unit 41 to extend its piston rod 45, thus swinging the rear sprocket arms upwardly and rearwardly about their pivots 31 to remove the cross shaft 32, the sprockets 33 and the chains 34 from behind the rolled bale so that the machine may leave the bale in the field. When the mechanical control valve 57 is in its release setting no fluid is supplied to the motor 48, and the check valve 59 permits the motor to idle in reverse so that the bottom chain run 34a can move oppositely to the direction of the arrow in FIG. 1 in order that the bale engaging members 35 may not interfere with release of the bale.

The bale size sensing means 70 includes a transverse shaft 71 which is pivoted in the side plates 20 near the front of the baling chamber, and fixedly secured to the shaft 71 in the vertical longitudinal median plane of the baling chamber is a rearwardly extending sensing arm 72 which has an idle position that is illustrated in full lines in FIG. 3 where its free end rests upon a forming bale. As the size of the bale increases the sensing arm 72 moves toward the broken line position of FIG. 3 and thus pivots the shaft 71 and an actuating arm 73, which is fixed on the shaft 71 outside the side frame, so that the actuating arm 73 turns counterclockwise as seen in FIGS. 3 and 5. A cable 74 connects the free end of the arm 73 with an actuating arm 75 which is fixed to the outer end of the shaft 69 as seen in FIG. 5 so that the counterclockwise movement of the arm 73 also produces counterclockwise movement of the arm 75, the shaft 60 and the arm 68, thereby causing the tension spring to pull the valve operating arm 64 forwardly against the tension of the balancing spring 65. When the sensing arm 72 reaches a predetermined point in accordance with the size of the bale, the actuating arm 64 moves from its rearward running setting to its forward discharge setting. The point at which this takes place may be varied by adjusting the length of the cable 74.

In case the tractor operator wishes to manually control the time that a bale is released, he may disconnect the cable 74 and move the control arm 64 by means of a cable 76 which is attached to a manual actuating arm 77 on the shaft 69.

Return of the valve control arm 64 from its release setting to its running setting is automatic, through the operation of a return cable 78 that is also attached to the arm 77 and to the bracket 43 on the rear sprocket support arm 30. When the support arm 30 reaches its fully elevated position during bale release the cable 78 acts through the arm 77 to turn the shaft 69 clockwise and thus release the tension on the forward spring 66 so that the rearward spring 65 may return the actuating arm 64 to its original position and thus return the control valve 57 to its running setting. The cable 78 may be adjusted to vary the exact position of the arms 30 at which the valve control arm 64 is returned to running position.

The foregoing detailed description is given for clearness of understanding only and no unnecessary limitation should be understood therefrom, as modifications will be obvious to those skilled in the art.

We claim:

1. Hay bale rolling apparatus comprising, in combination:
   a wheeled frame defining a baling chamber which is open at the bottom;
   bale rolling means movably supported in the baling chamber for engaging hay in a swath and rolling it into a bale in contact with the ground as the apparatus moves along the swath, said bale rolling means including a generally upright portion at the rear of the chamber which contacts the rear of a bale to confine the bale as it is rolled;
   rotary hydraulic motor means operatively connected to the bale rolling means to drive the latter;
   hydraulic power means for moving the generally upright bale confining portion of the bale rolling means upwardly and rearwardly out of contact with a bale to release said bale;
   hydraulic control circuit means including a single mechanical control valve having a running setting in which the bale confining means is in a bale rolling position and the hydraulic motor is driving the bale rolling means, and a release setting for actuating the hydraulic power means to move the generally upright bale confining portion of the bale rolling means to an elevated bale release position and for stopping the motor;
   means for moving said mechanical control valve from its running setting to its release setting when a bale reaches a predetermined size;
   and means for automatically returning said control valve to its running setting after release of a bale from the chamber.

2. The combination of claim 1 in which the means for moving the mechanical control valve from its running setting to its release setting comprises a manual actuator accessible to an operator.

3. The apparatus of claim 1 in which the means for moving the mechanical control valve from its running setting to its release setting comprises sensing means in the baling chamber which directly senses the diameter of a bale, and means operatively connecting the sensing means to the mechanical control valve to move said valve when a bale reaches a predetermined diameter.

4. The combination of claim 3 in which the sensing means comprises a sensing arm in the baling chamber which is pivotally mounted on the frame on a generally horizontal axis and which has a free end resting on a bale as the latter is rolled, and in which the arm is mechanically connected to the control valve.

5. The combination of claim 4 in which the mechanical connection includes means for adjusting the position of the sensing arm at which the valve is moved.

6. The combination of claim 4 in which the pivot axis for the sensing arm extends transversely near the front of the frame and the sensing arm extends rearwardly generally in the longitudinal vertical median plane of the frame.

7. The combination of claim 1 in which the means for automatically returning the control valve to its running setting comprises a mechanical connection between the bale confining means and the control valve which returns the control valve when the confining means reaches its elevated position.

8. The combination of claim 1 in which the hydraulic control circuit means includes a check valve which permits the rotary hydraulic motor to idle in reverse when the control valve is in its release setting.

9. The combination of claim 1 in which the bale rolling means includes rotatable front sprocket means driven by the rotary hydraulic motor, rotatable rear sprocket means forming a part of the bale confining means, rotatable upper sprocket means supported for bodily movement, chain means trained around all said sprocket means with a bale rolling lower chain run between the front and rear sprocket means, in which hydraulic cylinder and piston means is operatively connected to the upper sprocket means to control movement of the latter between a starting position in which the lower chain run engages hay in a swath and a terminal position in which said lower chain run is arched over a rolled bale in the chamber, and in which the hydraulic control circuit means includes an accumulator operatively associated with the cylinder and piston means so that said cylinder and piston means extends as the lower chain run arches progressively during the rolling of a bale and returns when the bale is released.

10. Hay bale rolling apparatus comprising, in combination:
   a wheeled frame defining a baling chamber which is open at the bottom;
   rotatable front sprocket means and rotatable rear sprocket means supported by the frame within the bottom portion of the baling chamber, and rotatable upper sprocket means supported near the top of the frame;

upper support means mounting said upper sprocket means on the frame for bodily movement between a starting position and a terminal position;

hay rolling chain means trained around all said sprocket means with a lower chain run between said front and rear sprocket means which engages hay in a swath on the ground;

means for driving one of the sprocket means so that the chain means moves forwardly in its lower run to roll hay into a bale in contact with the ground as the apparatus moves along a swath, said lower run arching progressively higher as the bale increases in size, and said arching being permitted by movement of the upper sprocket means toward terminal position;

pivotal means on the frame for elevating the rear sprocket means;

sensing means in the baling chamber which contacts the circumferential surface of the bale to continuously sense the diameter of the bale;

actuating means for moving the pivotal means to release a bale from the chamber;

and means operatively connecting the sensing means to the actuating means for initiating operation of the latter when the bale reaches a predetermined diameter.

11. The combination of claim 10 in which the sensing means comprises a sensing arm in the baling chamber which is pivotally mounted on the frame on a generally horizontal axis and which has a free end resting on a bale as the latter is rolled.

12. The combination of claim 11 in which the pivot axis for the sensing arm extends transversely near the front of the frame and the sensing arm extends rearwardly generally in the longitudinal vertical median plane of the frame.

13. Hay bale rolling apparatus comprising, in combination:

a wheeled frame defining a baling chamber which is open at the bottom;

rotatable front sprocket means journalled in the lower portion of the frame;

a pair of forward sprocket arms pivoted at their lower ends on the frame and having sprocket means journalled at their upper ends;

a pair of rear sprocket arms pivoted at their upper ends on the frame and having rear sprocket means journalled at their lower ends;

hay rolling chain means trained around all said sprocket means with a lower chain run between said front and rear sprocket means which engages hay in a swath on the ground;

forward hydraulic cylinder and piston means on the frame controlling movement of the forward sprocket arms between a starting position in which the lower chain run engages hay in a swath and a terminal position in which the lower chain run is arched over a rolled bale in the chamber;

rearward hydraulic cylinder means on the frame operatively connected to the rear sprocket arms to maintain said arms normally in a downwardly extending position closing the rear of the baling chamber, said rearward cylinder means being operable to elevate said arms and thereby open the rear of the baling chamber;

hydraulic motor means for driving the front sprocket means;

hydraulic control circuit means including a single mechanical control valve having a running setting in which the rear hydraulic cylinder means is retracted to retain the rear sprocket arms in their downwardly extending positions and the hydraulic motor is driving the front sprocket means, and a release setting for extending the rearward hydraulic cylinder means and stopping the motor;

means for moving said mechanical control valve from its running setting to its release setting when a bale reaches a predetermined size;

and means for automatically returning said control valve to its running setting after release of a bale from the chamber.

14. The combination of claim 13 in which the means for moving the mechanical control valve from its running setting to its release setting comprises a manual actuator accessible to an operator on a tractor to which the apparatus is attached.

15. The combination of claim 13 in which the means for moving the mechanical control valve from its running setting to its release setting comprises sensing means in the baling chamber which directly senses the diameter of a bale, and means operatively connecting the sensing means to the mechanical control valve to move said valve when a bale reaches a predetermiend diameter.

16. The combination of claim 15 in which the sensing means comprises a sensing arm in the baling chamber which is pivotally mounted on the frame on a generally horizontal axis and which has a free end resting on a bale as the latter is rolled, and in which the arm is mechanically connected to the control valve.

17. The combination of claim 16 in which the mechanical connection includes means for adjusting the position of the sensing arm at which the valve is moved.

18. The combination of claim 13 in which the means for automatically returning the control valve to its running setting comprises a mechanical connection between the rear sprocket arms and the control valve which returns the control valve when said rear arms reach a predetermined elevated position.

19. The combination of claim 18 in which the mechanical connection includes means for adjusting the position of the rear arms at which the control valve is returned.

20. The combination of claim 13 in which the hydraulic control circuit means includes a check valve which permits the rotary hydraulic motor to idle in reverse when the control valve is in its release setting.

21. The combination of claim 13 in which the hydraulic control circuit means includes an accumulator operatively associated with the forward hydraulic cylinder and piston means so that said cylinder and piston means extends as the lower chain run arches progressively during the rolling of a bale and returns when the bale is released.

* * * * *